(12) United States Patent
Mancin et al.

(10) Patent No.: US 8,572,936 B2
(45) Date of Patent: Nov. 5, 2013

(54) SEALING JAW FOR PRODUCING SEALED PACKAGES OF A FOOD PRODUCT

(75) Inventors: Sergio Mancin, Fidenza (IT); Francesco Giordano, Bologna (IT); Ernesto Di Dodo, East Morton Keighley (GB)

(73) Assignee: Tetra Laval Holdings & Financne S.A., Pully (CH)

( * ) Notice: Subject to any disclaimer, the term of this patent is extended or adjusted under 35 U.S.C. 154(b) by 490 days.

(21) Appl. No.: 12/919,235

(22) PCT Filed: Apr. 27, 2009

(86) PCT No.: PCT/EP2009/055074
§ 371 (c)(1),
(2), (4) Date: Aug. 25, 2010

(87) PCT Pub. No.: WO2009/133075
PCT Pub. Date: Nov. 5, 2009

(65) Prior Publication Data
US 2011/0030315 A1    Feb. 10, 2011

(30) Foreign Application Priority Data
Apr. 29, 2008   (EP) ..................................... 08155341

(51) Int. Cl.
*B65B 7/02*   (2006.01)

(52) U.S. Cl.
USPC .......... 53/548; 53/373.7; 53/374.2; 53/374.6; 53/550

(58) Field of Classification Search
USPC ............ 53/373.7, 374.2, 548; 156/581, 583.1
IPC ............................................... B65B 9/20,51/30
See application file for complete search history.

(56) References Cited

U.S. PATENT DOCUMENTS 4,455,808 A * 6/1984 Netzhammer ............... 53/371.2
4,582,555 A * 4/1986 Bower .......................... 156/290

(Continued)

FOREIGN PATENT DOCUMENTS

DE   1 279 320   10/1968
DE   1 604 580   11/1970

(Continued)

OTHER PUBLICATIONS

International Search Report (PCT/ISA/210) issued on Aug. 17, 2009, by Japanese Patent Office as the International Searching Authority for International Application No. PCT/EP2009/055074.

(Continued)

*Primary Examiner* — Alexandra Elve
*Assistant Examiner* — Adam Moon
(74) *Attorney, Agent, or Firm* — Buchanan Ingersoll & Rooney PC

(57) ABSTRACT

A sealing jaw for producing sealed packages of a food product from a tube of packaging material fed along a path, the jaw having a first work surface which interacts with a second work surface on a counter-jaw to grip the packaging material and form a sealing strip crosswise to the path. One of the jaw and counter-jaw defines an anvil, and the other defines a heating device which interacts with the anvil to form the strip. The first surface has at least two projections elongated along respective first axes, and which, when forming the strip, compress respective areas of the packaging material against the second surface; and at least one cavity which extends along one of the first axes, is interposed between the projections along a second axis crosswise to the first axis, and is located laterally with respect to a central plane of the first work surface.

20 Claims, 4 Drawing Sheets

(56) References Cited

U.S. PATENT DOCUMENTS

| | | | |
|---|---|---|---|
| 5,015,223 A * | 5/1991 | Boeckmann | 493/194 |
| 6,482,291 B1 | 11/2002 | Kume et al. | |
| 6,877,295 B1 | 4/2005 | Benedetti et al. | |
| 7,003,934 B1 | 2/2006 | Yano | |
| 7,104,028 B2 | 9/2006 | Paradisi et al. | |
| 7,348,525 B2 | 3/2008 | Kupfer et al. | |
| 2002/0189206 A1 | 12/2002 | Capodieci | |
| 2009/0200358 A1 | 8/2009 | Violleau et al. | |

FOREIGN PATENT DOCUMENTS

| | | |
|---|---|---|
| EP | 0 615 907 A1 | 9/1994 |
| EP | 1 088 760 A2 | 4/2001 |
| EP | 1 127 794 A2 | 8/2001 |
| JP | 2001-97318 A | 4/2001 |
| JP | 2001-233309 A | 8/2001 |
| JP | 2002-249110 A | 9/2002 |
| RU | 2 253 599 C2 | 6/2005 |
| RU | 2 314 237 C2 | 1/2008 |
| RU | 2005 115 841 A | 3/2009 |
| WO | WO 2008/012469 A2 | 1/2008 |

OTHER PUBLICATIONS

Written Opinion (PCT/ISA/237) issued on Aug. 17, 2009, by Japanese Patent Office as the International Searching Authority for International Application No. PCT/EP2009/055074.

Decision to Grant Russian Patent Application No. 2010148395 issued May 13, 2013 by the Russian Patent Office and English translation of Decision to Grant (12 pgs).

Japanese Office Action issued Apr. 19, 2013 by the Japanese Patent Office in Japanese Application No. 2011-506679 and English translation of Office Action(4 pgs).

* cited by examiner

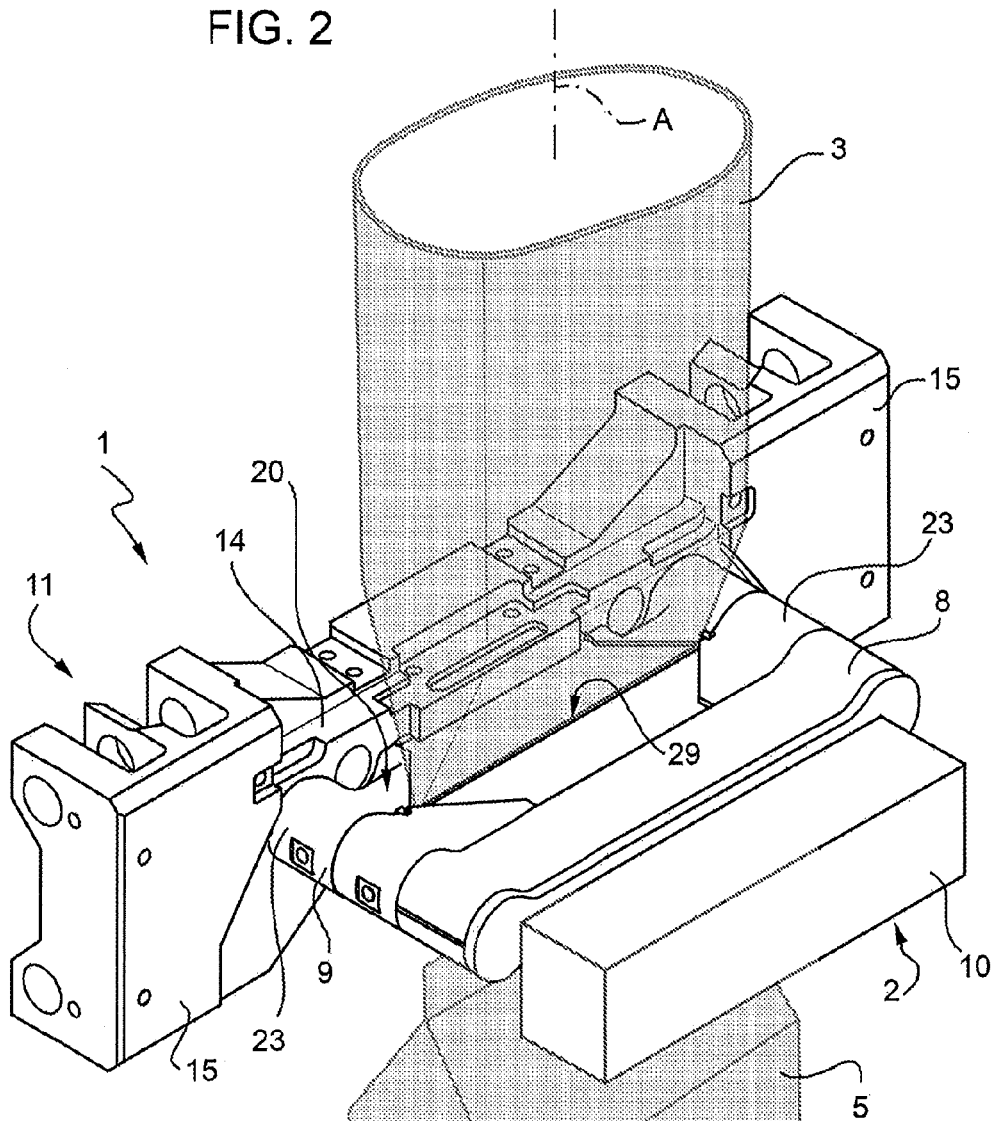
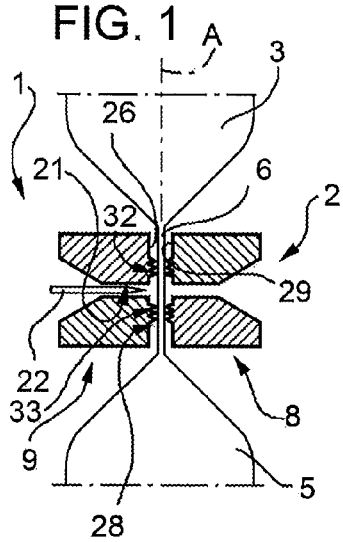

SEALING JAW FOR PRODUCING SEALED PACKAGES OF A FOOD PRODUCT

TECHNICAL FIELD

The present invention relates to a sealing jaw for producing sealed packages of a food product.

BACKGROUND ART

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material. More specifically, the web of packaging material is unwound off a reel and fed through an aseptic chamber on the packaging machine, where it is sterilized, e.g. by applying a sterilizing agent such as hydrogen peroxide, which is subsequently evaporated by heating, and/or by subjecting the packaging material to radiation of appropriate wavelength and intensity; and the sterilized web is maintained in a closed, sterile environment, and is folded into a cylinder and sealed longitudinally to form a continuous tube in known manner.

The tube of packaging material, which in effect forms an extension of the aseptic chamber, is fed in a vertical direction, is filled with the sterilized or sterile-processed food product, and is fed through a sealing device to form the individual packages. More specifically, in the sealing device, the tube is sealed at a number of equally spaced cross sections to form pillow packs connected to one another by transverse sealing strips, i.e. extending perpendicularly to the travelling direction of the tube; and the pillow packs are separated from one another by cutting the relative transverse sealing strips, and are conveyed to a folding station where they are folded mechanically to form respective finished parallelepiped-shaped packages.

Packaging machines are known, as described for example in European Patent EP-B-0887265, which comprise two chain conveyors defining respective endless paths and fitted with respective numbers of sealing jaws. The two paths have respective branches substantially facing and parallel to each other, and between which the tube of packaging material is fed so that the jaws on one conveyor cooperate with corresponding jaws on the other conveyor along said branches of the respective paths, to grip the tube at a number of successive cross sections, and to seal and cut the packs.

Packaging machines are also known comprising only two pairs of jaws, which act alternately on the tube of packaging material to grip and seal, e.g. heat seal, it along a number of equally spaced cross sections.

Once the sealing operation is completed, a cutter, carried, for example, by one of the jaws in each pair, is activated, and interacts with the tube of packaging material to cut it along a centre line of the cross section just sealed, and so detach a pillow pack from the bottom end of the tube of packaging material. The bottom end being sealed transversely, the relative jaws, on reaching the bottom dead-centre position, can be opened to avoid interfering with the top portion of the tube. At the same time, the other pair of jaws, operated in exactly the same way, moves down from the top dead-centre position, and repeats the above grip/form, seal and cut process.

In both types of packaging machines, the tube portion gripped between each pair of jaws is normally sealed by heating means carried on one of the jaws and which locally melt the layers of heat-seal plastic material gripped between the jaws.

Ultrasound sealing devices are now widely used to locally melt the packaging material faster and so increase output.

Ultrasound sealing devices substantially comprise a mechanical-vibration generator, or sonotrode, and an anvil—as described, for example, in EP-B-615907—which are fitted to respective jaws, and have respective surfaces which cooperate with each other to heat the packaging material by ultrasound vibration.

More specifically, a sonotrode is a sealing tool which is vibrated by one or more disks of piezoelectric material; the disks are supplied with alternating voltage, and generate mechanical vibration of an energy depending on the actual supply voltage or electric current supply.

A need is felt within the industry to prevent the formation, at the sealing stage, of polyethylene blisters or lumps, which impair sealing quality and, in some cases, may even pierce the barrier material layer, thus impairing the aseptic nature of long-storage products.

DISCLOSURE OF INVENTION

It is an object of the present invention to provide a sealing jaw designed to meet the above requirement in a simple, low-cost manner.

According to the present invention, there is provided a sealing jaw for producing sealed packages of food products.

BRIEF DESCRIPTION OF THE DRAWINGS

A preferred, non-limiting embodiment of the present invention will be described by way of example with reference to the accompanying drawings, in which:

FIG. 1 shows a schematic side view, with parts removed for clarity, of a sealing jaw in accordance with the present invention, and a corresponding counter-jaw in a closed position;

FIG. 2 shows a view in perspective, with parts removed for clarity, of the FIG. 1 jaw and counter-jaw;

BEST MODE FOR CARRYING OUT THE INVENTION

Figure 3:
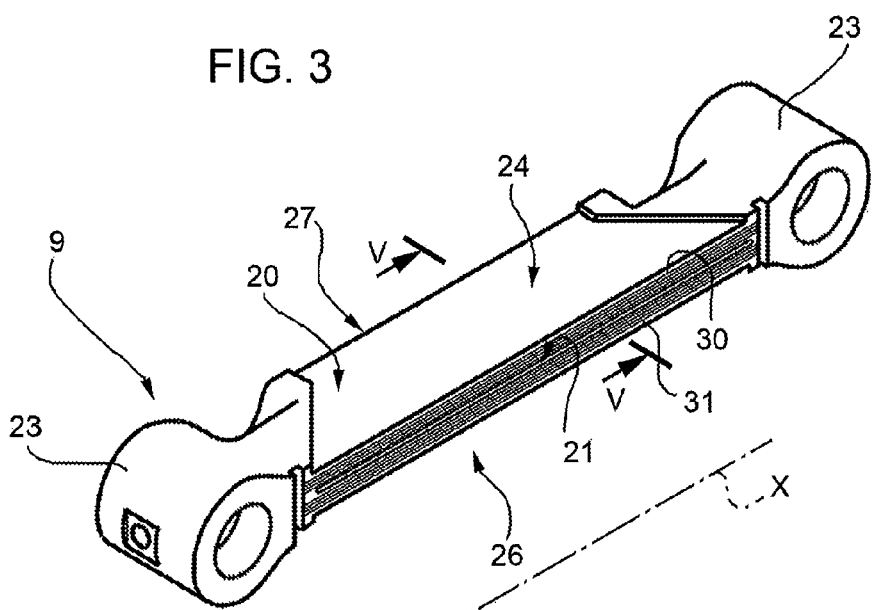
FIG. 3 shows a larger-scale view in perspective of an anvil of the FIGS. 1 and 2 jaw.
Figure 4:
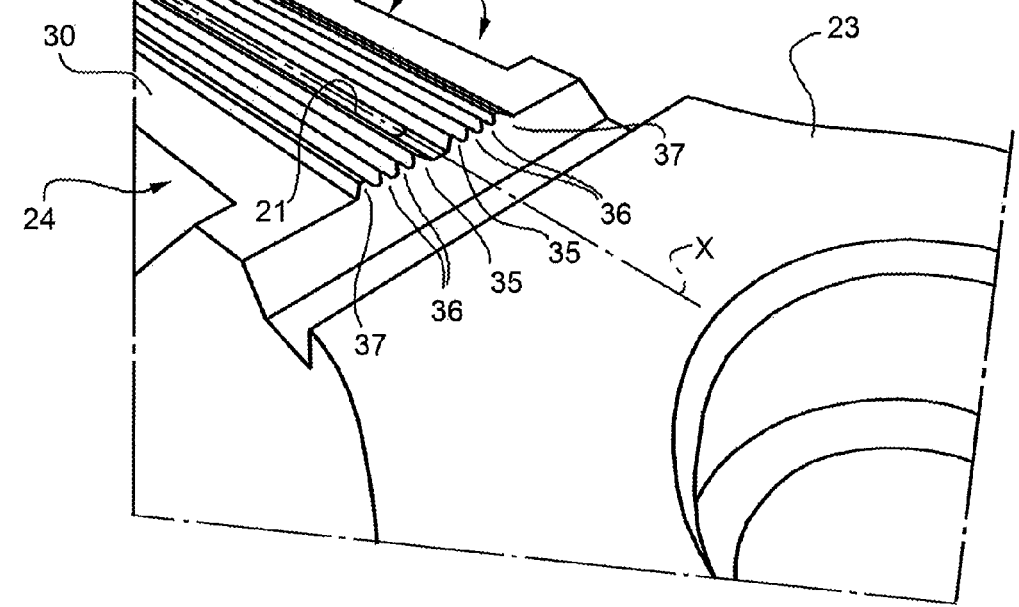
FIG. 4 shows a larger-scale view in perspective of a portion of the FIG. 3 anvil viewed from a different angle from FIG. 3.

Number 1 in FIGS. 1 and 2 indicates as a whole a jaw in accordance with the present invention, for producing sealed packages of a food product.

Jaw 1 can be incorporated in a packaging machine (not shown) for producing sealed packages of a food product from a tube 3 of packaging material fed by known devices (not shown) along a vertical path A.

Jaw 1 is preferably incorporated in a packaging machine for producing sealed packages of a pourable food product, such as pasteurized or UHT milk, fruit juice, wine, peas, beans, etc.

Jaw 1 may also be incorporated in a packaging machine for producing sealed packages of a food product that is pourable at the package manufacturing stage, and sets after the package is sealed. One example of such a food product is a portion of cheese, that is melted at the package manufacturing stage, and sets after the package is sealed.

Tube 3 is formed in known manner by longitudinally folding and sealing a web of heat-seal sheet material, and is filled continuously downwards with the sterilized or sterile-processed food product for packaging.

The packaging machine comprises two chain conveyors, of the type illustrated and described in Patent EP-B-615907, which define respective endless paths and are fitted with respective numbers of sealing jaws 1 and corresponding counter-jaws 2. The paths have respective branches substantially parallel to each other and between which tube 3 is fed along path A, so that, along said branches of the respective paths, jaws 1 on one conveyor cooperate with corresponding counter-jaws 2 on the other conveyor to grip, ultrasound-seal, and cut tube 3 at a number of equally spaced cross sections.

More specifically, each jaw 1 and the corresponding counter-jaw 2 interact to seal tube 3 at a number of equally spaced cross sections and form pillow packs 5 connected to tube 3 by respective sealing strips 6 (FIG. 1) perpendicular to path. A.

Strips 6 are cut by a cutter 22 on jaw 1 to separate packs 5.

Each counter-jaw 2 and corresponding jaw 1 are located on opposite sides of tube 3, are fitted respectively with a mechanical-vibration generator or sonotrode 8 and an anvil 9, and are movable, crosswise to path A, between an open position and a closed position (shown in FIGS. 1 and 2), in which they grip and seal tube 3 at a relative cross section to form a relative sealing strip 6.

Sonotrode 8, only shown schematically in FIGS. 1 and 2, preferably comprises a number of side by side ultrasound heads of the type illustrated and described in Patent EP-B-615907, and housed in an outer casing 10 fitted rigidly to the body of counter-jaw 2.

Very briefly, sonotrode 8 is a sealing tool vibrated by one or more disks of piezoelectric material; the disks are supplied with alternating voltage, and generate mechanical vibration of an energy depending on the actual supply voltage.

Each jaw 1 substantially comprises a supporting body 11, and anvil 9.

Supporting body 11 (FIG. 2) is substantially flat, and comprises a central portion 14 and two end portions 15. With reference to the closed position of each jaw 1 and corresponding counter-jaw 2, supporting body 11 lies in a plane parallel to path A, and end portions 15 are larger than central portion 14 in a direction parallel to path A.

Anvil 9 comprises a substantially prismatic main body 20 defining a through seat 21 (FIGS. 1 to 4) housing cutter 22; and two end portions 23 in the form of respective hollow cylinders and located at opposite ends of main body 20.

More specifically, main body 20 comprises (FIG. 3):
two, respectively top and bottom, walls 24, 25 lying in respective parallel planes perpendicular to path A, when jaw 1 and corresponding counter-jaw 2 are in the closed position;
a front wall 26 interposed crosswise between walls 24 and 25, and through which seat 21 is formed; and
a further wall 27 (FIGS. 5, 6) interposed perpendicularly between walls 24 and 25, located on the opposite side to wall 26, and through which seat 21 is also formed.

More specifically, wall 26 comprises a surface 28 (FIGS. 5 and 6) which interacts with a surface 29 (FIG. 1) of sonotrode 8 to grip and seal tube 3 to form a relative strip 6; and two flat surfaces 30, 31 parallel to wall 27 and interposed between surface 28 and walls 24, 25.

Surface 28 extends symmetrically with a central plane of symmetry P of wall 26, and surfaces 30, 31 are located o opposite sides of central plane P.

More specifically, plane P divides surface 28 into two equal portions 32, 33 (FIG. 5) which cooperate with respective halves of surface 29 to form respective halves of strip 6.

Portions 32, 33 are interposed between seat 21 and relative surfaces 30, 31.

Seat 21 has a plane of symmetry coincident with central plane P.

Cutter 22 is housed in sliding manner inside seat 21, and is controlled by a known actuating device (not shown) to cut tube 3 along transverse strips 6 to detach the formed pack 5 from tube 3.

Surface 26 advantageously comprises (FIGS. 4 and 5):
a number of elongated projections 35, 36, 37 extending along respective axes X (only one shown in FIGS. 3, 4, 5, 6) and which press respective areas of the packaging material against surface 29; and
a number of elongated cavities 40 extending parallel to axes X, located on either side of plane P, and each of which is interposed between a respective pair of projections 35-36, 36-36, 36-37 adjacent to each other along an axis Y crosswise to axes X.

More specifically, projections 35, 36, 37 project with respect to surfaces 30, 31 towards path A when relative jaw 1 and corresponding counter-jaw 2 are in the closed position.

Along axis Y, from seat 21 to relative surface 30, 31, each portion 32, 33 comprises:
a projection 35;
three cavities 40 alternating with two projections 36 and equally spaced along axis Y; and
a projection 37.

Along axis Y, a first cavity 40 of each portion 32, is interposed between respective projection 35 and the respective adjacent projection 36; a second cavity 40 is interposed between respective projections 36; and a third cavity 40 is interposed between respective adjacent projection 36 and respective projection 37.

Each cavity 40 has a profile 41 in the form of the lateral surface of a half-cylinder with an axis parallel to axes X.

In other words, when sectioned perpendicularly to axes X, each profile 41 is in the form of a half-circle.

Each profile 41 is symmetrical with respect to a respective bottom generating line 49 parallel to axis X.

More specifically, generating lines 49 lie in a plane at a distance from the common plane of surfaces 30, 31, and define the points of surface 28 furthest from surface 29 of sonotrode 8 when relative jaw 1 and corresponding counter-jaw 2 are in the closed position.

Cavities 40 of each portion 32, 33 are located entirely on a respective side of seat 21, i.e. are not intersected by plane P.

Cavities 40 of each portion 32, 33 are also equally spaced along axis Y.

From seat 21 to respective adjacent cavity 40, each projection 35 is defined by two flat walls 42, 43 at an angle, and by a curved wall 44.

More specifically, walls 43 are flat and lie in respective planes perpendicular to plane P; and walls 42 slope with respect to plane P and converge with each other from respective walls 43 towards seat 21.

Walls 44 are in the form of respective lateral surface portions of respective cylinders with respective axes parallel to axes X.

When sectioned in respective planes perpendicular to axes X (FIGS. 5 and 6), the profiles of walls 44 are in the form of respective arcs of less than a hundred and eighty degrees.

Each projection 36 is defined by two walls 44, and by a wall 43 interposed between walls 44 along axis Y.

More specifically, walls 44 defining each projection 36 are symmetrical with respect to relative wall 43, and are in the form of respective lateral surface portions of cylinders with respective parallel, spaced axes.

From relative surface 30, 31 to adjacent cavity 40, each projection 37 is defined by two flat walls 45, 46 at an angle, and by a wall 44.

More specifically, walls 45 are interposed between relative surfaces 30, 31 and relative walls 46, and converge with each other from relative surfaces 30, 31 towards relative walls 46.

The radii of first imaginary cylindrical surfaces defining respective profiles 41 are greater than radii of the second imaginary cylindrical surfaces defining respective walls 44.

In the example shown, the radius of each first surface is 1.5 times the radius of each second surface.

In one embodiment of the invention, the radius of at least one second imaginary cylindrical surface defining respective wall 44 of one respective projection 35, 36, 37 is in the range between 0.1 and 0.3 mm.

Preferably, the radius of profile 41 of at least one cavity 40 between projections 37, 36; 36, 36; 36, 35 is in the range between 0.1 and 0.4 mm, at least at the bottom part thereof most distant from the peaks of projections 35, 36, 37.

Furthermore, the distance measured along axis Y between corresponding points of adjacent projections 35, 36; 36, 36; 36, 37 or between corresponding points of adjacent cavities 40 is preferably in the range between 0.5 and 2.5 mm.

In particular, the radius of at least one second imaginary cylindrical surface defining one respective wall 44 of one respective projection 35, 36, 37 is 0.2 mm; the radius of profile 41 of at least one cavity 40 between projections 37, 36; 36, 36; 36, 35 is 0.3 mm at the bottom part thereof most distant from the peaks of projections 35, 36, 37; and the distance measured along axis Y between corresponding points of adjacent projections 35, 36; 36, 36; 36, 37 or between corresponding points of adjacent cavities 40 is 1.8 mm. Any combination of the above radiuses within the ranges above specified is possible, provided that the combination is geometrically feasible.

This design of projection 35, 36, 37 and/or cavities 40 creates less damage to the packaging material. The above-specified radiuses are not the result of mere rounding of sharp edges, but rather a deliberate and accurate forming of surface 28 of sealing jaw 1.

Furthermore, projections 35, 36, 37 and adjacent profiles 41 are connected to avoid angular tips and/or sharp edges.

In other words, in respective common segments, profiles 41 and walls 44 have coincident tangent planes.

Likewise, in respective common segments, walls 42-43-44, 44-43-44, 44-46-45 also have coincident tangent planes.

Walls 46 are longer than walls 43 along axis Y, and lie in the same plane as walls 43.

Walls 43, 46 define the top portions of respective projections 35, 36, 37, i.e. the portions of surface 28 furthest from surfaces 30, 31 in a direction parallel to plane P, and closest to surface 29 of sonotrode 8 when relative jaw 1 and corresponding counter-jaw 2 are moved towards each other.

Figure 5:
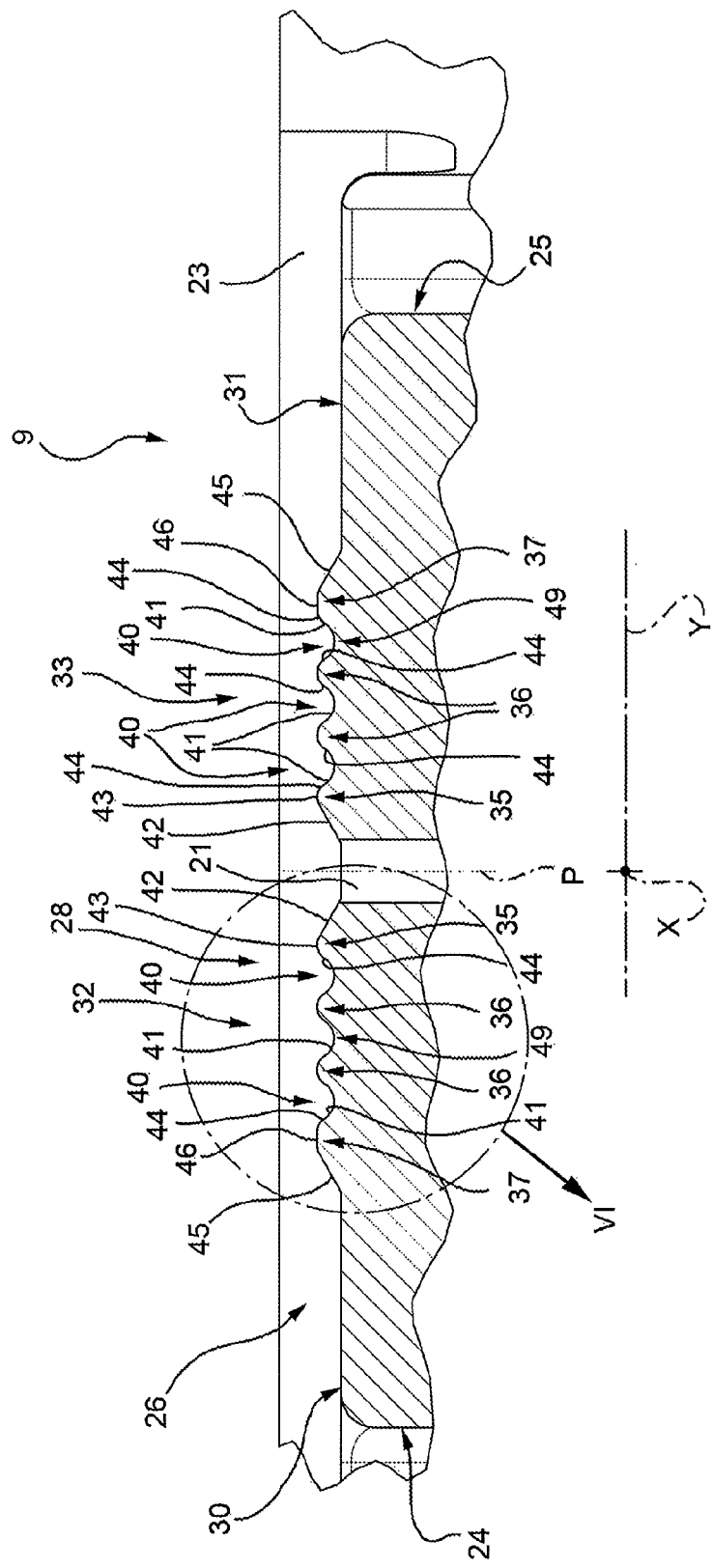
FIG. 5 shows a larger-scale section in plane V-V of the FIG. 3 anvil.
Figure 6:
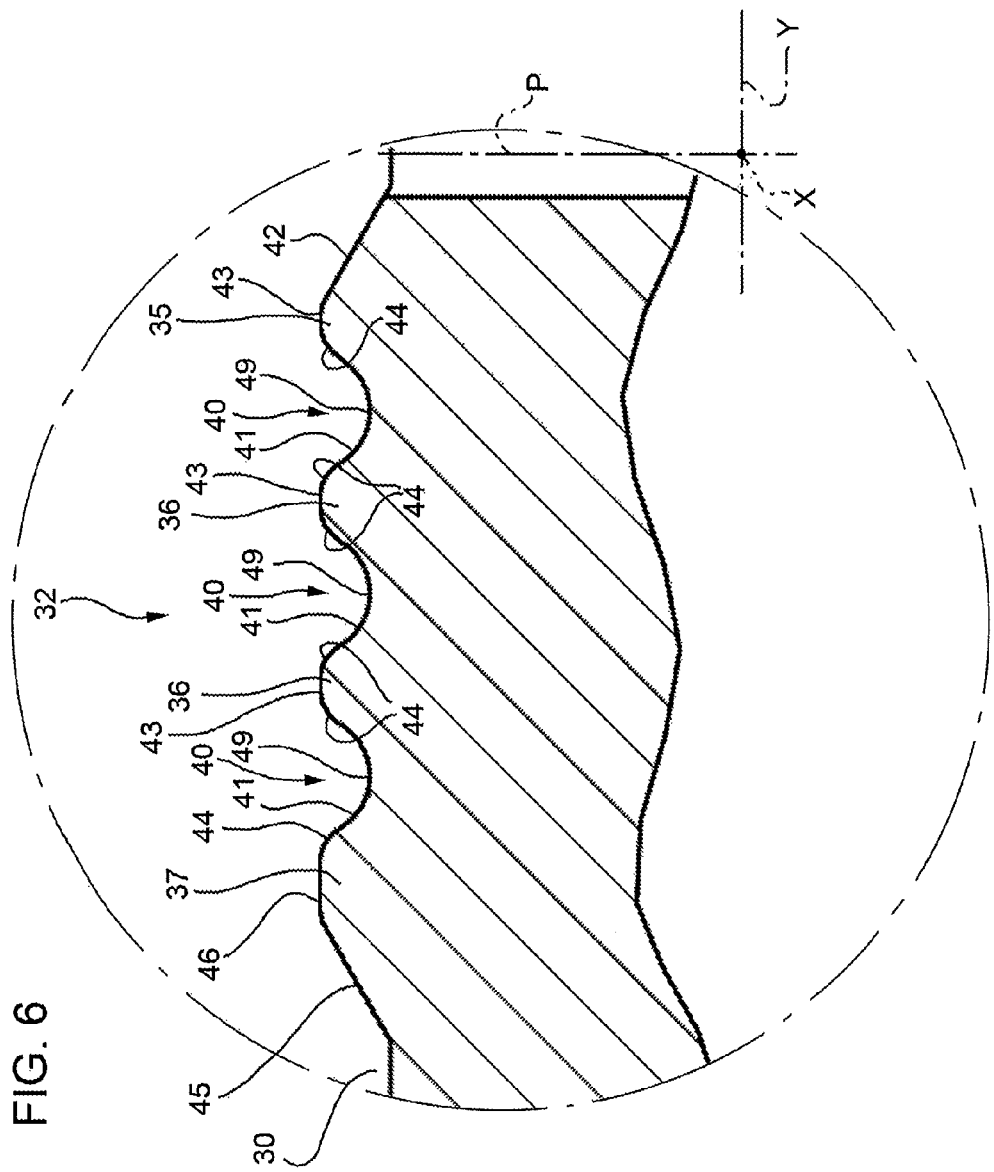
FIG. 6 shows a larger-scale view of details in FIG. 5.

As shown in FIGS. 5 and 6, when sectioned in a respective plane perpendicular to axes X, each portion 32, 33 of surface 28 is undulated in shape and comprises, from relative surface 30, 31 towards plane P along axis Y:
- first straight portions corresponding to walls 45, 46;
- a number of second portions defining respective concavities facing relative surface 30, 31 and corresponding to respective walls 44;
- a number of third portions alternating with the second portions, defining respective concavities facing away from relative surface 30, 31, and corresponding to profiles 41 of respective cavities 40; and
- fourth straight portions corresponding to respective walls 43, 42 of projection 35.

When sectioned in a respective plane perpendicular to axes X, each portion 32, 33 also comprises fifth straight portions, each interposed between the second portions of a relative projection 36, and which correspond to respective walls 43 of projections 36.

More specifically, axes X are parallel to one another and to walls 24, 25, and axis Y is perpendicular to axes X.

When jaws 1 and corresponding counter-jaws 2 are in the closed position, axes Y are parallel to path A, and axes X are perpendicular to path A.

Jaw 1 operates as follows.

The two chain conveyors are rotated in opposite directions so that jaws 1 and corresponding counter-jaws cooperate with tube 3 with a predetermined law of motion.

The operating cycle will now be described in more detail with reference to one jaw 1 and a corresponding counter-jaw 2, all the jaws 1 and corresponding counter-jaws 2 obviously performing the same cycle at time intervals depending on the output rate.

Along given portions of said paths, jaw 1 and corresponding counter-jaw 2 are brought together from the open position to gradually deform and eventually "flatten" tube 3 to form a transverse band of tube 3.

On reaching the closed position, jaw 1 and corresponding counter-jaw 2 grip tube 3, surfaces 28 and 29 are pressed against each other, and sonotrode 8 is activated to locally heat and melt the packaging material and so form strip 6.

More specifically, the pressure on the packaging material is greatest at walls 43, and decreases gradually from walls 43 to generating lines 49 of profiles 41 of cavities 40.

Sonotrode 8 heats the packaging material in proportion to the pressure exerted on the packaging material by surfaces 28 and 29.

The packaging material is therefore melted predominantly at walls 43 of surface 28, and flows into cavities 40 of surface 28.

Once strip 6 is formed, cutter 22 is activated to cut tube 3 along transverse strip 6 and so detach the formed pack 5 from the rest of tube 3.

Jaw 1 and corresponding counter-jaw 2 are then moved into the open position, away from path A, to release tube 3.

The advantages of jaw 1 according to the present invention will be clear from the above description.

In particular, providing alternating numbers of projections 35, 36, 37 and cavities 40 enables the pressure on the packaging material, when forming strips 6, to be varied from a maximum at walls 43 to a minimum at bottom generating lines 49 of respective cavities 40.

The packaging material can thus be sealed over a particularly extensive area corresponding to the sum of the surface areas of projections 35, 36, 37 and cavities 40.

The melted polyethylene forming part of the packaging material therefore flows freely into cavities at the sealing stage, without forming lumps or blisters, which would impair sealing quality and may even pierce the barrier material layer, thus impairing the aseptic nature of long-storage products.

Moreover, surface 28 having no sharp edges, the packaging material undergoes very little stress when sealing strips 6, thus reducing the risk of damaging the packaging material and so impairing the aseptic nature of the finished packages.

Clearly, changes may be made to jaw 1 as described and illustrated herein without, however, departing from the protective scope defined in the accompanying Claims.

In particular, projections 35, 36, 37 and cavities may be defined by surface 29 of sonotrode 8, as opposed to surface 28 of anvil 9.

The packaging machine may have no chain conveyors, and comprise one jaw 1 and a corresponding counter-jaw 2, which act alternately on tube 3, are each movable along respective guide between a closed position and an open position, and interact cyclically and successively with the tube to heat seal the packaging material of the tube.

Instead of sonotrode 8, counter-jaw 2 may be fitted with a sealing device with different heating means, e.g. induction heating means or means comprising a heated bar.

Finally, jaw 1 may have no seat 21, and packs 5 may be cut downstream from the packaging machine.

The invention claimed is:

1. A sealing jaw, for producing sealed packages of a food product from a tube of packaging material fed along a path, comprising a first work surface which interacts with a second work surface on a counter-jaw to grip said packaging material and form a sealing strip crosswise to said path; one of said jaw and counter-jaw defining an anvil, and the other of said jaw and counter-jaw defining heating means which interact with said anvil to form said strip;

wherein said first surface comprises:

at least two projections elongated along respective first axes, and which, when forming said strip, compress respective areas of said packaging material against said second surface; and at least one cavity which extends along one of said first axes, is interposed between two consecutive said projections along a second axis crosswise to said first axis, and is located laterally with respect to a central plane of said first work surface;

at least a first of said projections being defined by two curved first walls;

at least one of said first walls, when sectioned in a second plane perpendicular to the respective said first axis creates an imaginary cylindrical surface, comprising a first arc of a first radius and a first angle;

said cavity having a curved profile;

said profile, when sectioned in a plane perpendicular to said first axis creates another imaginary cylindrical surface, being in the form of at least a second arc of a second radius and a second angle;

said first radius is in a range between 0.1 and 0.3 mm;

said second arc defining a bottom part of said cavity and said second radius being in a range between 0.1 and 0.4 mm; and a distance between said projections measured along said second axis being in a range between 0.5 and 2.5 mm.

2. A jaw as claimed in claim 1, wherein said anvil defines said first work surface; said counter-jaw comprising said heating means defining said second surface.

3. A jaw as claimed in claim 1, wherein said first projection comprises a flat second wall defining the top of said first projection and interposed between said first walls along said second axis.

4. A jaw as claimed in claim 1, wherein said second angle is greater than said first angle.

5. A jaw as claimed in claim 1, wherein said second radius is greater than said first radius.

6. A jaw as claimed in claim 1, wherein said profile is contiguous to at least one of said first walls; said profile and said at least one first wall having respective tangent coincident planes at a common segment parallel to said first axes.

7. A jaw as claimed in claim 1, wherein a second of said projections is interposed between said central plane and said first projection; from said central plane towards said first projection, said second projection being defined by a flat third wall, by a fourth wall sloping with respect to said third wall and defining a top of said second projection, and by a curved fifth wall.

8. A jaw as claimed in claim 7, comprising a third projection located on the opposite side of said first projection to said central plane; from a side of said first projection on an opposite side to said central plane, said third projection being defined by a curved sixth wall, by a flat seventh wall defining a top of said third projection, and by a flat eighth wall sloping with respect to said seventh wall.

9. A jaw as claimed in claim 1, comprising a first number of said projections; and a first number of said cavities equally spaced along said second axis, and each interposed between two consecutive said projections.

10. A jaw as claimed in Claim 9, comprising a second number of said projections and a second number of said cavities; said first and second numbers being located on respective opposite sides of said central plane of said surface.

11. A jaw as claimed in claim 1, wherein said first axes are parallel; and said second axis is perpendicular to said first axes; said second axis being parallel to said path when said jaw and said counter-jaw grip the packaging material and form said strip.

12. A packaging machine for producing sealed packages of a food product from a tube of packaging material fed along a vertical path, filled continuously with said food product, and gripped at equally spaced cross sections;

said machine comprising a jaw, as claimed in claim 1, and said counter-jaw, which cooperate with each other to seal the packaging material of said tube along a number of said strips at said cross sections.

13. A jaw as claimed in claim 1, wherein said first projection comprises a flat second wall defining a top of the first projection, the flat second wall being positioned between two of the first walls along the second axis.

14. A jaw as claimed in claim 1, wherein a plurality of said projections exist on opposite sides of the central plane of the first work surface and a plurality of said cavities exist on opposite sides of the central plane of the first work surface.

15. A jaw as claimed in claim 1, wherein plural number of the projections exist on opposite sides of the central plane of the first work surface and plural number of the cavities exist on opposite sides of the central plane of the first work surface, the number of the projections on opposite sides of the central plane of the first work surface being equal, and the number of the cavities on opposite sides of the central plane of the first work surface being equal.

16. A sealing jaw, for producing sealed packages of a food product from a tube of packaging material fed along a path, comprising a first work surface which interacts with a second work surface on a counter-jaw to grip the packaging material and form a sealing strip crosswise to the path; one of the jaw and counter-jaw defining an anvil, and the other of the jaw and counter-jaw defining heating means which interact with the anvil to form the strip;

the first work surface comprising:
- at least two projections elongated along respective first axes, and which, when forming the strip, compress respective areas of the packaging material against the second work surface;
- at least one cavity extending parallel to the first axes, each cavity being interposed between two consecutive projections along a second axis crosswise to the first axis, and located laterally with respect to a central plane of the first work surface;
- at least one of the projections being defined by two curved first walls;
- at least one of the first walls, when sectioned in a second plane perpendicular to the respective first axis creates an imaginary cylindrical surface, comprising a first arc possessing a first radius;
- the cavity possessing a curved profile which, when sectioned in a plane perpendicular to the first axis creates another imaginary cylindrical surface, is in a form of at least a second arc defining a bottom part of the cavity and possessing a second radius; and
- the first radius and the second radius being different from one another.

17. A jaw as claimed in claim 16, wherein the first work surface exists on the anvil and the second work surface exists on the counter-jaw, the counter jaw including the heating means.

18. A jaw as claimed in claim 16, wherein the first projection comprises a flat second wall defining a top of the first projection and interposed between the first walls.

19. A jaw as claimed in claim 16, wherein a second of the projections is interposed between the central plane and the first projection; extending from the central plane towards the first projection, the second projection being defined by a flat third wall, by a fourth wall sloping with respect to the third wall and defining a top of the second projection, and by a curved fifth wall.

20. A jaw as claimed in claim 19, comprising a third projection located on an opposite side of the first projection to the central plane; from a side of the first projection on an opposite side to the central plane, the third projection being defined by a curved sixth wall, by a flat seventh wall defining a top of the third projection, and by a flat eighth wall sloping with respect to the seventh wall.

* * * * *